United States Patent [19] | [11] 4,187,605
Selvin et al. | [45] Feb. 12, 1980

[54] METHOD OF MAKING ELECTRICAL CONNECTOR ASSEMBLY

[75] Inventors: Gerald J. Selvin, Birmingham, Mich.; Leland W. Oliver, Santa Ana, Calif.; Stephen K. Yamamoto, Los Angeles, Calif.; Clarence V. Hogan, Sun Valley, Calif.

[73] Assignee: International Telephone and Telegraph Corporation, New York, N.Y.

[21] Appl. No.: 883,913

[22] Filed: Mar. 6, 1978

Related U.S. Application Data

[60] Division of Ser. No. 788,315, Apr. 18, 1977, Pat. No. 4,114,976, which is a continuation-in-part of Ser. No. 679,342, Apr. 22, 1976, abandoned.

[51] Int. Cl.$^2$ .......... H02G 15/00
[52] U.S. Cl. .......... 29/629; 339/217 S
[58] Field of Search .......... 29/629, 451, 628; 339/218 R, 218 C, 218 L, 218 M, 97 R, 217 R, 217 J, 217 PS, 217 TP, 220 R, 220 L, 220 T, 217 S; 174/84 R

[56] References Cited

U.S. PATENT DOCUMENTS

| | | | |
|---|---|---|---|
| Re. 26,994 | 12/1970 | Fuller et al. | 29/628 X |
| 2,291,434 | 7/1942 | Hollopeter et al. | 339/97 R X |
| 3,061,503 | 10/1962 | Gould et al. | 339/218 R |
| 3,288,914 | 11/1966 | Fuller et al. | 174/84 R |
| 3,494,998 | 2/1970 | Anhalt | 339/218 R X |
| 3,561,095 | 2/1971 | Bergmann | 29/451 |
| 3,594,696 | 7/1971 | Witek, Jr. | 339/218 R X |
| 3,781,986 | 1/1974 | Joslyn et al. | 339/218 R X |

*Primary Examiner*—Francis S. Husar
*Assistant Examiner*—C. J. Arbes
*Attorney, Agent, or Firm*—T. L. Peterson

[57] ABSTRACT

A contact retaining clip is fixed in an insulator cavity by the use of discontinuities around the clip which can be wedged or embedded in the insulator. Preferably a probe is inserted into the clip to expand it. The clip and/or the probe may be heated prior or during insertion or by heating after insertion of the clip but before expansion of the clip.

13 Claims, 13 Drawing Figures

STEP 2: INSERT CLIP THEN HEAT EITHER OR BOTH OF CLIP AND PROBE BEFORE OR AFTER INSER-TION.

STEP 3: EMBED BARBS DIELECTRIC UNDER HEAT AND PRESSURE.

STEP 1: INSTALL CLIP IN CAVITY.

STEP 2: INSERT CLIP THEN HEAT EITHER OR BOTH OF CLIP AND PROBE BEFORE OR AFTER INSER-TION.

STEP 3: EMBED BARBS DIELECTRIC UNDER HEAT AND PRESSURE.

STEP 4: REMOVE PROBE. BARBS RETAIN CLIP IN CAVITY.

METHOD OF MAKING ELECTRICAL CONNECTOR ASSEMBLY

RELATED APPLICATIONS

This is a division of application Ser. No. 788,315, filed Apr. 18, 1977, now U.S. Pat. No. 4,114,976 which is a continuation-in-part of application Ser. No. 679,342, filed Apr. 22, 1976, now abandoned.

BACKGROUND OF THE INVENTION

This invention relates to the electrical connector art, and more particularly to an electrical connector assembly and method of making the same.

In the past, a one-piece insulator has been provided with a cavity having a shoulder at each end formed by an aluminum bushing located on a mold core pin. The bushing is removed by etching in an acid bath. A clip is then snapped in place between the shoulders. The clip may be of the type to retain a contact or otherwise, or of a type similar to or the same as that disclosed in U.S. Pat. No. 3,158,424. However, this assembly is expensive to manufacture because of the etching step and the step of inserting the clip into the cavity.

Another such assembly is conventionally made by molding the insulator in two pieces and then cementing the two pieces together with the clip in the cavity. However, this method is sometimes impractical because in some instances, the center to center spacing of the clips is minimal and very thin barriers must be molded on the front insulator so that the connector's electrical requirements can be met. These thin barriers are impractical to mold or uneconomical to add as separate parts. Also, the two molded parts plus cementing is costly.

U.S. Pat. No. 3,494,998 to Anhalt teaches a method of mounting a contact retention clip in a one-piece insulator in which a clip is slidably mounted into a bore in the insulator to abut a shoulder therein. An appropriate amount of heat and pressure is then applied to the rear of the insulator adjacent to the bore opening to deform the insulator material surrounding the opening so that a shoulder or abutment is formed in the insulator engaging the rear edge of the clip. If necessary, a suitable mandrel is slidably inserted within the bore to support the insulator material and the clip during the deforming operation. This technique has the disadvantage that it is difficult to control the deformation of the rear of an insulator containing a large number of contact bores. As a consequence, the rear surface of the insulator may be uneven resulting in unequal push out forces on the clips in the insulator.

SUMMARY OF THE INVENTION

In accordance with the electrical connector assembly of the present invention, the above-described and other disadvantages of the prior art are overcome by mounting a contact retention clip into an insulator cavity without the need for two shoulders to hold the clip in place. For this purpose, the clip is provided with one or more discontinuities that are lodged in the insulator, the insulator being made of a material that is thermally deformed to seize upon the discontinuities. The clip is longitudinally split and is expanded while the insulator material surrounding the clip is heated to a deformable or softened state so that the discontinuities in the clip become embedded in the material.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
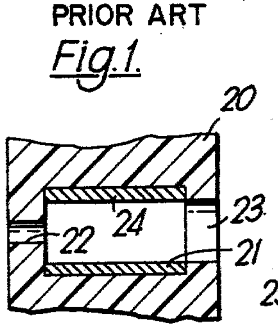
PRIOR ART Fig.1.
FIG. 1 is a broken away vertical sectional view through an electrical connector assembly which has been partially constructed in accordance with the prior art.
Figure 2:
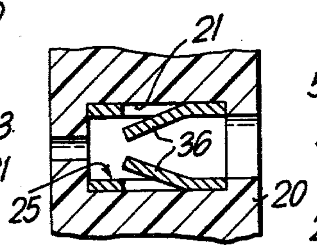
PRIOR ART Fig.2.
FIG. 2 is a broken away vertical sectional view of a prior art electrical connector assembly.

In FIG. 1, a prior art method of fabricating an electrical connector assembly is shown including an insulator 20 having an internal bore 21, and counter bores 22 and 23. When insulator 20 is molded, an aluminium sleeve 24 is located in a core pin (not shown), and insulator 20 is molded around sleeve 24. When insulator 20 has been molded around sleeve 24 as shown in FIG. 1, sleeve 24 is removed from bore 21 by etching with an acid. A contact retention clip 25 shown in FIG. 2 is then placed in bore 21. Clip 25 may be similar to or identical to one of the clips disclosed in Bowen U.S. Pat. No. 3,158,424. Clip 25 releasably retains an electrical connector contact, not shown.

The prior art method of making the electrical connector assembly shown in FIG. 2 is expensive because it is expensive to etch sleeve 24 in FIG. 1, and it is expensive to insert clip 25 in bore 21 shown in FIG. 2.

Figure 3:
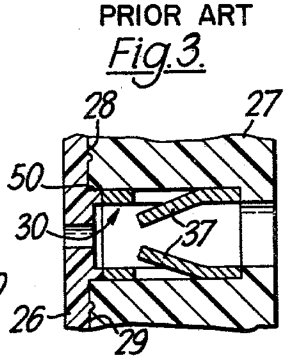
PRIOR ART Fig.3.
FIG. 3 is a broken away vertical sectional view of another prior art electrical connector assembly.

Another prior art electrical connector assembly is shown in FIG. 3 including two insulators 26 and 27 which may be cemented together along lines 28 and 29. A clip is provided at 30 which, if desired, may be identical to clip 25. Insulators 26 and 27 are molded, assembled to clip 30, and cemented together. The electrical connector assembly of the prior art shown in FIG. 3 is expensive to make because it requires two parts, a connecting operation, and thin barriers 50 to void voltage breakdown.

The contact retention assembly disclosed in the aforementioned Anhalt patent has a construction similar to that illustrated in FIG. 2. However, it has the disadvantage that the rear of the insulator is often uneven so that the push-out forces for the clips are not uniform.

Figure 4:
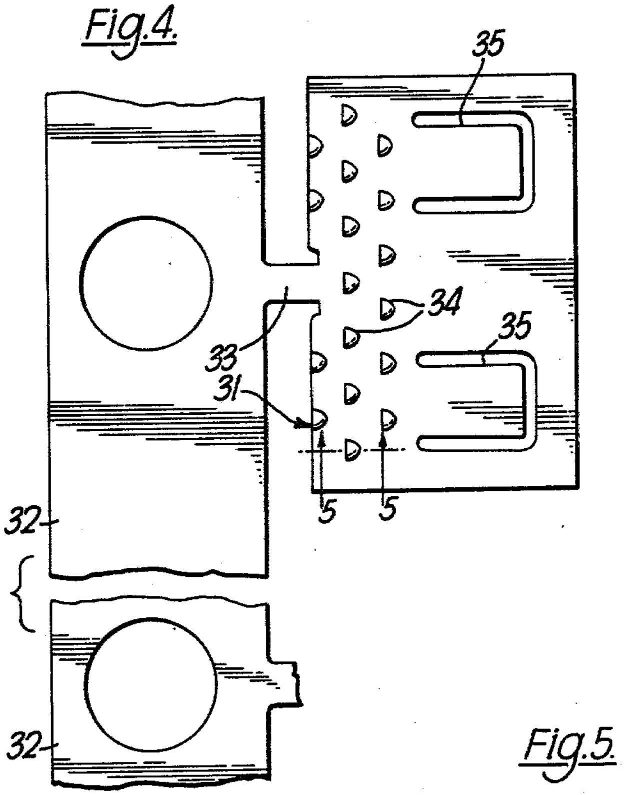
FIG. 4 is a top plan view of a formed blank from which a contact retaining clip is fabricated in accordance with the present invention.
Figure 5:
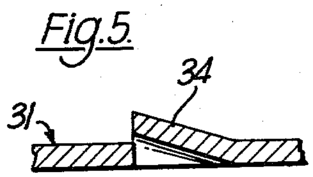
FIG. 5 is a vertical sectional view through a portion of the blank shown in FIG. 4, taken along line 5—5 therein.

In accordance with the present invention, a blank 31 of resilient sheet metal shown in FIG. 4 may be continually made on a strip 32 and may be connected thereto by means illustrated at 33. The blank is substantially flat except for barbs 34 shown in FIGS. 4 and 5. The barbs are stamped out of the material of the blank 31 thus leaving small apertures in the blanks, as seen in FIG. 5. The blank embodies leaf spring tines 35 similar to or identical to tines 36 and 37 shown in FIGS. 2 and 3, respectively. The blank 31 is formed into a contact retention clip as illustrated at 38 in FIG. 6 having a generally cylindrical configuration.

A one-piece molded insulator body 12 formed of thermally deformable material is employed for mounting clip 38 or a clip 10' similar to or identical to clip 38 as shown in FIGS. 8, 9, 10, and 11.

Figure 8:
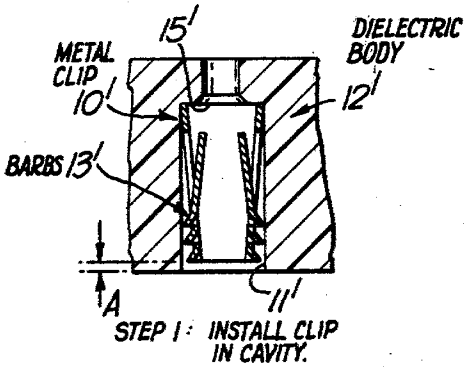
FIGS. 8, 9, 10, and 11 are broken away vertical sectional views of an insulator and a clip similar to that shown in FIG. 6 illustrating steps which may be performed in accordance with the present invention to lodge the clip in a fixed position in a bore in the insulator.
Figure 9:
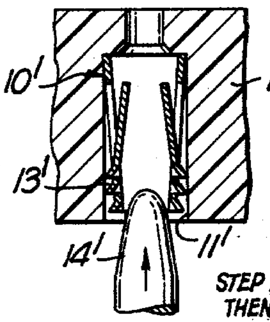
Figure 10:
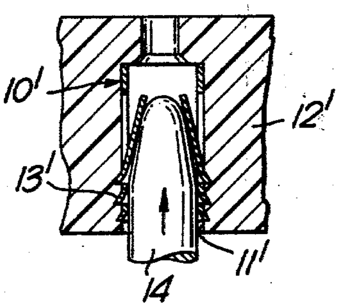
Figure 11:
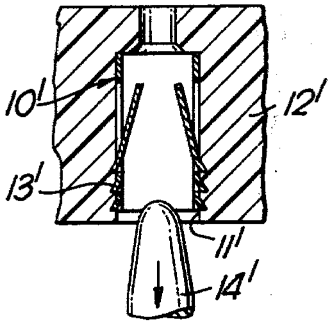

In general, by the present invention, the clip 10' is inserted into a cylindrical bore 11' in insulator body 12'. Preferably, the forward end of the clip abuts a shoulder 15' in the bore 11', as seen in FIG. 8. However, the shoulder may not be necessary in all cases. The clip 10' may have a loose sliding fit in the bore or may frictionally engage the wall of the bore when first inserted therein. The insulator material of body 12' surrounding the bore is heated to a sufficient temperature to cause it to soften and flow under pressure. The clip is caused to expand in the bore so that barbs 13' thereon will become embedded in the softened insulator material as seen in FIG. 11. The softened material totally surrounds the barbs to prevent the possibility of Corona discharge degradation between adjacent clips in the insulator body. When the clip is expanded in the bore, some of the softened insulator material will flow into the small apertures in the clip formed by the stamped out barbs. This will enhance retention of the clip in bore 11' and will prevent moisture from the external environment from leaking through the apertures behind the clip wall. Thus, by the above-described heat staking operation, the clip is seized by the insulator material to firmly hold the clip against axial movement in bore 11'. The insulator material surrounding the bore may be heated by heating the clip, in which case the insulator material is heated by conduction. The clip 10' may be heated before insertion of the clip into bore 11' or by heating of the clip after insertion.

Preferably, the diameter of the clip in its relaxed or unstressed condition is greater than the diameter of the bore 11' in body 12'. In this case, the clip must be slightly collapsed to reduce its cross-section in order to insert it into the bore.

If the clip 10' is relatively large and oversized with respect to the diameter of bore 11', it will possess relatively high hoop stress when collapsed and inserted into the bore. If the clip is inserted into the bore warm or hot the clip will expand to the position shown in FIG. 11 without further operations due to its inherent resiliency.

In a preferred embodiment of the invention, when the clip is initially inserted into the bore, it simply frictionally engages the wall of the bore. A cylindrical probe 14' is then pushed into the clip. The probe has a diameter larger than the inside diameter of clip 10' when the clip is initially inserted into bore 11'. Preferably, the diameter of probe 14' is equal to the diameter of bore 11' less two times the thickness of the wall of the clip (excluding the barbs 13'). The end of the probe is tapered to facilitate its insertion into the clip. Also, preferably probe 14' is heated so that when it is pushed into the clip, heat from the probe will transfer through the clip by conduction to the insulator causing the same to soften. Simultaneously with the probe heating the insulator, the clip is expanded by the probe causing the barbs 13' in the clip to embed into the softened insulator material surrounding bore 11'. As stated previously, some insulator material will also be forced into the apertures in clip 10' resulting from the stamped out barbs 13'. The probe is then removed from bore 11' and the softened insulation material cools and hardens to seize about the barbs and fixedly retain the clip within the bore.

It has been found that by this method an annular lip of insulator material (not shown) may, in some cases, be formed at the rear of the clip 10' which enhances the retention of the clip in the bore 11'. Normally, this lip does not cover the entire rear edge of the clip so that at least a portion of said rear edge is exposed to the opening of bore 11' at the rear of body 12'. Therefore, it will be appreciated that the inside diameter of clip 10' is less than the diameter of bore 11' in the completed assembly, as seen in FIG. 11.

By way of example only, the insulator material may be a polysulfone type polymer. In actual practice of the preferred method using such material and probe 14', the probe was heated to about 700° F. A 30% glass loaded 6/6 nylon was also used as the insulator in which case the probe was heated to about 600° F. With such materials and at such temperatures, the clip 10' may be heat staked into the insulators in about 1.5 seconds.

Many alternatives of the method are possible. The probe 14' and/or clip 10' may be heated before or after insertion into bore 11', but before expansion of the clip in the bore. The method described hereinbefore will place clip 10' in the location shown in FIG. 11. Barbs 13' thus will become embedded in the thermally deformable insulator body 12' and some insulator material will flow into the aperture formed by the stamped out barbs due to the pressure exerted on the material by probe 14'. Therefore, the clip 10' will be held in a fixed position inside bore 11'.

Figure 6:
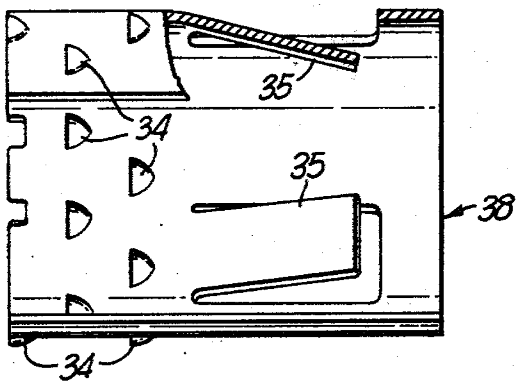
FIG. 6 is a broken away view, partly in section, of a clip formed from the blank shown in FIG. 4.
Figure 7:
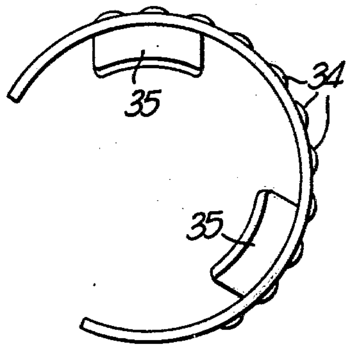
FIG. 7 is a right end elevational view of a contact retaining clip illustrated in FIG. 6.
Figure 12:
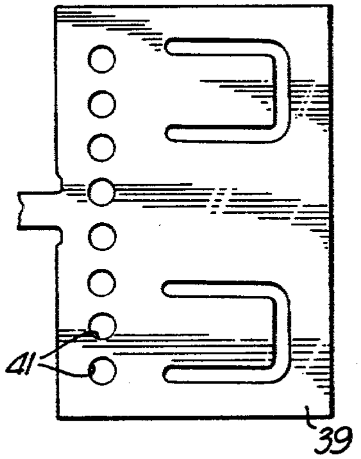
FIG. 12 is a top plan view of a clip blank constructed in accordance with another embodiment of the present inventions.
Figure 13:
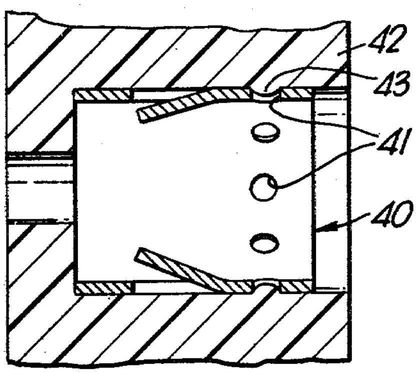
FIG. 13 is a broken away vertical sectional view of an electrical connector assembly constructed in accordance with the present invention utilizing a clip fabricated from the blank shown in FIG. 12.

In FIGS. 12 and 13, a clip blank 39 and clip 40 are respectively illustrated which may be similar to or identical to the clip 38 shown in FIG. 6 except that holes 41 are provided rather than barbs 34 shown in FIG. 4.

An insulator is illustrated at 42 in FIG. 13 in which clip 40 is mounted and the thermally deformable material thereof extends into holes 41 as indicated at 43.

All the insulators disclosed herein are made of a thermally deformable material. Thus, this material may be a thermoplastic, a mixture of thermosetting and thermoplastic materials, a thermoplastic containing structural fillers, such as glass fibers for example, or a "B" stagable thermsetting plastic. The latter plastic is an intermediate stage material which is heat deformable before cross-linking. After the plastic is heated to embed the barbs of the clip therein, it becomes thermosetting. Therefore, the insulator material used in the present invention must be heat deformable at least at the time the clip is heat staked therein, but it may not necessarily be thermoplastic thereafter.

The construction of the clips of the present invention are, it will be noticed, not critical.

Any or all of the clips disclosed herein may be made of a metal such as copper, or plastic or other similar or different material.

The dimension A shown in FIG. 8 may be equal to zero. However, some space is preferably provided, and the dimension A is not equal to zero in order to lengthen the voltage breakdown path. In other words, the lower end of clip 10′ shown in FIG. 8 may be flush with the lower surface of insulator body 12′, but that condition is not preferable, and the condition or position of the lower end of clip 10′ relative to the bottom surface of body 12′ at the distance A therefrom is preferred.

It will be appreciated that the present invention lends itself to rapid, inexpensive, mass-production techniques of inserting contact retention clips into electrical connector insulators. A size 20 contact retention clip as shown in FIGS. 4 to 11 has a very high push-out force, on the order of 30 lbs. This force substantially exceeds the 15 lb. push-out force required by military specification. Therefore, the contact retention assembly of the present invention provides a very reliable mechanism for releasably retaining contacts in an electrical connector. Furthermore, the assembly requires only a one-piece insulator body for mounting the retention clips, in contrast to the prior art assembly illustrated in FIG. 3. It is noted that the one-piece insulator body 12′ is a hard insulator which rigidly holds the clip 10′. Normally, an elastomeric grommet is bonded to the rear of the body 12′ for sealing contacts mounted in bores 11′ from the external environment. Thus, the term "one-piece insulator" as used herein and in the claims is intended to mean a one-piece hard insulator which receives the clip 10′, and is not intended to exclude an elastomeric sealing grommet or the like, positioned behind the insulator.

What is claimed is:

1. The method of making an electrical connector assembly, said method comprising the steps of:

providing a thermally deformable insulator body having a bore therein;

providing a contact retention clip comprising a longitudinally slit, hollow resilient body, said clip body embodying a forwardly and inwardly extending spring tine struck from the wall thereof providing an aperture in said wall and said clip body having a plurality of discontinuities therearound spaced from said aperture;

inserting said clip into said bore;

heating the portion of said insulator body surrounding said clip body in the vicinity of said discontinuities to cause said insulator body portion to soften; and while said insulator body portion is softened, causing said clip body to expand in said bore to cause said insulator body portion to seize upon said discontinuities and to prevent axial movement of said clip in said bore.

2. The method according to claim 1 wherein:

said discontinuities include outwardly extending barbs, on said clip body said barbs embedding into said insulator body portion when said clip body is expanded in said bore.

3. The method according to claim 1 wherein:

said heating step is performed by heating said clip prior to its insertion into said bore.

4. The method according to claim 1 wherein:

said heating step is performed by heating said clip after insertion into said bore.

5. The method according to claim 1 wherein:

said insulator body portion is heated and said clip body is expanded simultaneously by pushing a heated probe into said clip body.

6. The method according to claim 1 wherein:

said clip body is expanded by inserting a probe therein having a cross-section greater than that of the interior of said clip body when said clip is initially inserted into said bore.

7. The method according to claim 1 wherein:

said bore and body clip are cylindrical; and said body clip is expanded by pushing a cylindrical probe into the interior of said body clip.

8. The method according to claim 7 wherein:

said discontinuities include outwardly extending barbs on said clip body; and the diameter of said probe is equal to the diameter of said bore less two times the thickness of the wall of said clip body.

9. The method according to claim 1 wherein:

said insulator body portion is heated by heating said clip; and said clip body is expanded in said bore simultaneously with the heating of said clip.

10. The method according to claim 1 wherein:

said discontinuities include apertures in the wall of said clip body; and said insulator body portion flows into said apertures during said insulator heating and clip expanding steps.

11. The method according to claim 1 wherein:

said clip has a front and a rear, said discontinuities being located adjacent to the rear of said clip; and said insulator body portion is heated and said clip body is expanded simultaneously by pushing a heated probe into said rear of said clip.

12. The method of making an electrical connector assembly, said method comprising the steps of:

providing a thermally deformable insulator body having a bore therein;

providing a contact retention clip comprising a longitudinally slit, hollow resilient body having a plurality of discontinuities therearound;

inserting said clip into said bore;

providing a heated probe having a cross-section greater than that of the interior of said clip bore when said clip is initially inserted into said bore; and inserting said probe into said clip thereby simultaneously heating the portion of the insulator body surrounding said clip body in the vicinity of said discontinuities to cause said insulator body portion to soften and expanding said clip body in said body to cause said insulator body portion to seize upon said discontinuities and prevent axial movement of said clip in said bore.

13. The method according to claim 12 wherein:

said discontinuities include outwardly extending barbs on said clip body; and the cross-section of said probe is substantially equal to the cross-section of said bore less two times the thickness of the wall of said clip body, whereby said barbs become embedded into said insulator body portion when said probe is inserted into said clip.

* * * * *